US007612792B1

(12) United States Patent
Beck et al.

(10) Patent No.: US 7,612,792 B1
(45) Date of Patent: Nov. 3, 2009

(54) METHOD AND APPARATUS FOR ADAPTIVE VIDEO ENCODING BASED ON USER PERCEPTION AND USE

(75) Inventors: Alexander John Gray Beck, Frenchs Forest (AU); Colin Blair, Westleigh (AU); Andrew W. Lang, Epping (AU); Paul Thomas McNamara, Killarney Heights (AU); David Preshan Thambiratnam, Ashfield (AU); James K. Wan, Carlingford (AU)

(73) Assignee: Avaya Inc, Basking Ridge, NJ (US)

( * ) Notice: Subject to any disclaimer, the term of this patent is extended or adjusted under 35 U.S.C. 154(b) by 772 days.

(21) Appl. No.: 11/220,939

(22) Filed: Sep. 7, 2005

(51) Int. Cl.
*H04N 7/14* (2006.01)
(52) U.S. Cl. .................. 348/14.01; 382/232
(58) Field of Classification Search ............ 348/14, 348/231.99, 558, 663; 382/243.232; 725/47, 725/116; 375/240.01
See application file for complete search history.

(56) References Cited

U.S. PATENT DOCUMENTS

| | | | | |
|---|---|---|---|---|
| 5,537,150 A | * | 7/1996 | Sugiyama et al. ............ 348/558 |
| 5,719,962 A | * | 2/1998 | Sugahara et al. ............ 382/239 |
| 7,240,286 B2 | * | 7/2007 | Yamaguchi et al. ......... 715/723 |
| 7,295,712 B2 | * | 11/2007 | Hattori .................... 382/232 |
| 2002/0028024 A1 | * | 3/2002 | Jayant et al. ............... 382/243 |
| 2004/0090557 A1 | * | 5/2004 | Yoshii ..................... 348/663 |
| 2006/0195881 A1 | * | 8/2006 | Segev et al. ................ 725/116 |
| 2007/0002946 A1 | * | 1/2007 | Bouton et al. .......... 375/240.01 |
| 2008/0129843 A1 | * | 6/2008 | Kuriyama et al. ....... 348/231.99 |

FOREIGN PATENT DOCUMENTS

JP 2005-191949 * 7/2005

* cited by examiner

*Primary Examiner*—Curtis Kuntz
*Assistant Examiner*—Maria El-Zoobi
(74) *Attorney, Agent, or Firm*—John C. Moran

(57) ABSTRACT

A method and apparatus control the use of transmission bandwidth by detecting a change in presentation of a video picture on a receiving telecommunication terminal; transmitting the detected change to a transmitting telecommunication terminal; and adjusting the transmission rate of the video picture in response to the detected change by the transmitting telecommunication terminal.

10 Claims, 5 Drawing Sheets

METHOD AND APPARATUS FOR ADAPTIVE VIDEO ENCODING BASED ON USER PERCEPTION AND USE

TECHNICAL FIELD

This invention relates to the communication of video information.

BACKGROUND

Video calls and video conferencing has become more common due to the improvement in technology. However, a large amount of bandwidth is still required to provide acceptable video resolution and motion. Within the prior art, it is known to limit and adjust the video resolution based on the bandwidth capabilities of the network which is transporting the video information. Within the prior art, when a video call is set up, a certain CODEC is used and is typically maintained for the duration of the call. The only changes that are typically made with respect to the CODEC and bit-rate of transmission are those to improve the network or terminal performance. The higher-quality imaging CODEC that is used translates into a high bit-rate of transmission.

SUMMARY

A method and apparatus control the use of transmission bandwidth by detecting a change in presentation of a video picture on a receiving telecommunication terminal; transmitting the detected change to a transmitting telecommunication terminal; and adjusting the transmission rate of the video picture in response to the detected change by the transmitting telecommunication terminal.

DETAILED DESCRIPTION

Figure 1:
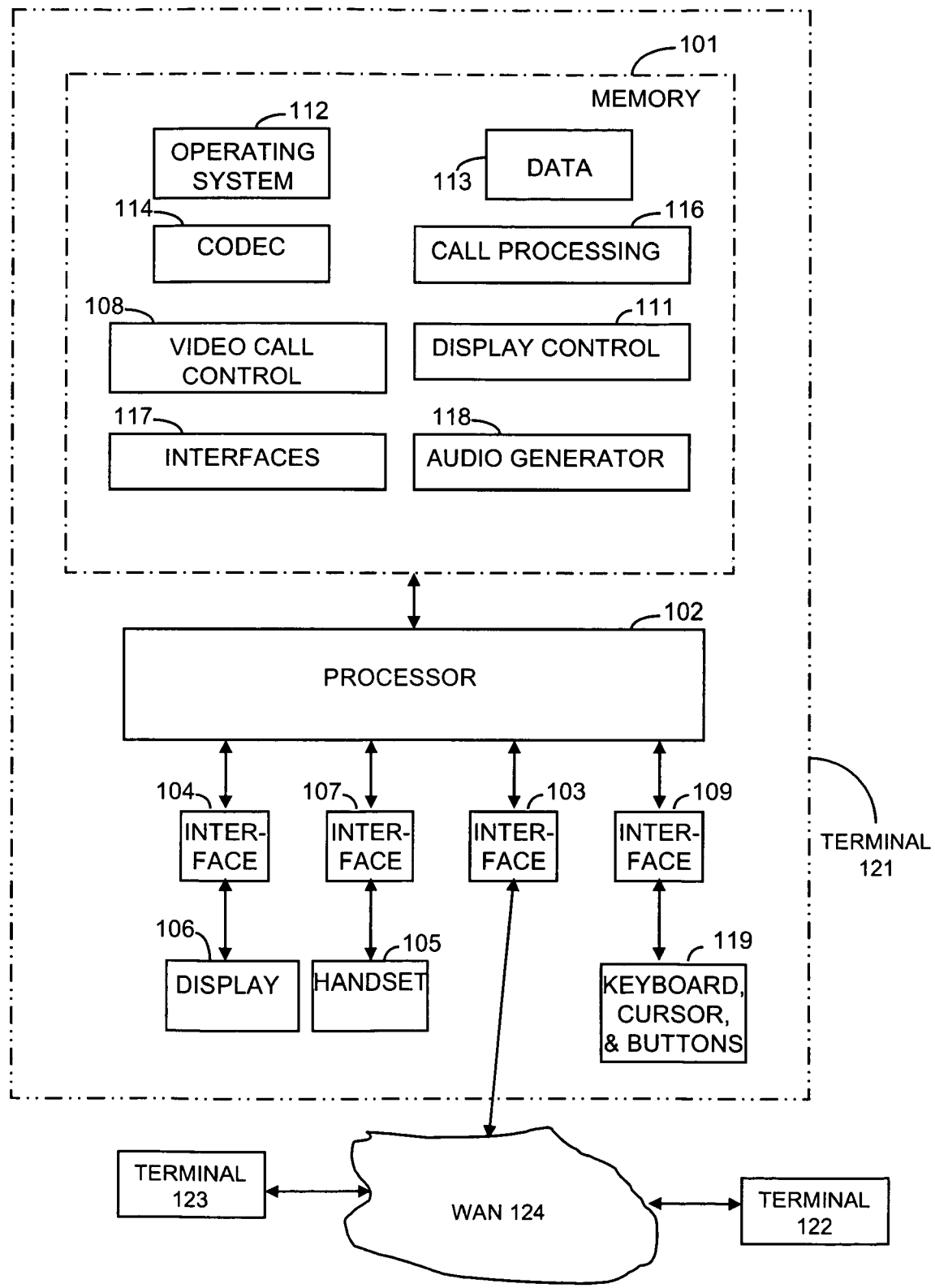
FIG. 1 illustrates an embodiment.

During a video call, one embodiment is responsive to the area occupied by the video picture being reduced to a smaller size to reduce the transmission rate required to support the lower resolution of the smaller size. Similarly, the embodiment negotiates for increased transmission capacity if the video picture increases in size thus increasing the resolution of the video picture.

In another embodiment, a terminal that causes a portion of a video picture to be hidden behind an image being displayed by another application or from another source transmits a specification of the hidden section to the terminal or terminals that are transmitting the video picture to the receiving terminal. The transmitting terminal or terminals then eliminate the transmission of the area of the video picture that is being hidden by the display of the application. Note, that various things could be hiding the video picture other than the action of an application, including operations of the operating system, etc.

To understand the operation of the first embodiment, consider the following example. Terminal 121 and terminal 123 are engaged in a video call. Terminals 122 and 123 are similar in makeup to terminal 121. The video picture of the video call is displayed for the user of terminal 121 on display 106. This video picture is received from terminal 123. Assume initially that video picture 201 of FIG. 2 occupies the majority of display 106. Since video picture 201 is a large area, terminals 121 and 123 have to utilize a high-quality imaging CODEC which results in a high bandwidth requirement being placed on transmission through wide area network (WAN) 124.

Figure 2:
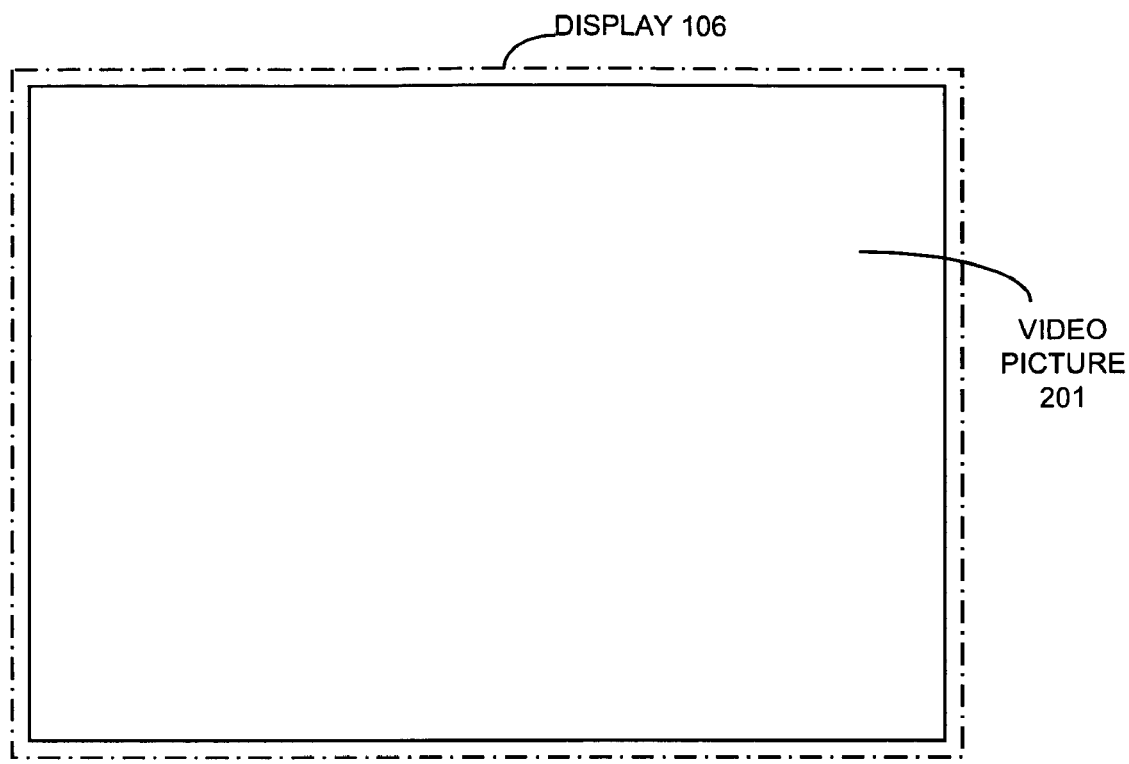
FIGS. 2-4 illustrate examples of displays on a display of a terminal.
Figure 3:
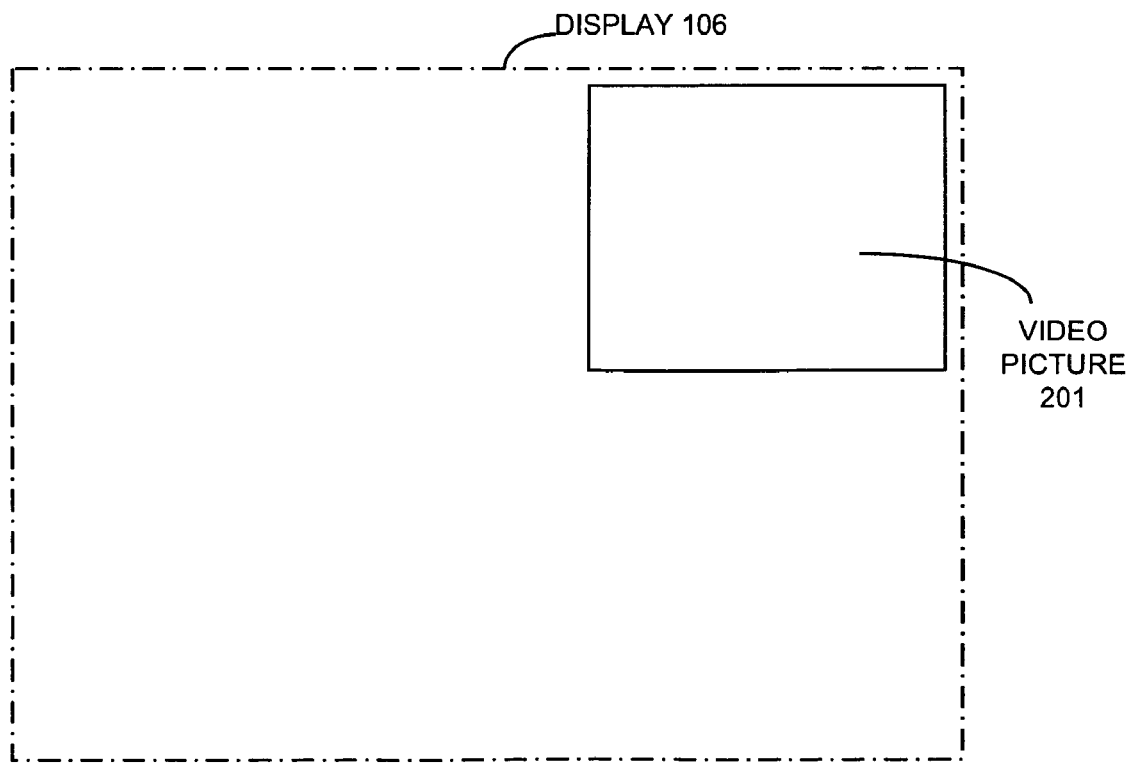

Assume that the user of terminal 121, using well known techniques, reduces the video picture 201 to the size illustrated in FIG. 3. Since video picture 201 is smaller in size, it requires less resolution than the video picture 201 of FIG. 2. Consequently, terminal 121 renegotiates the reduced bandwidth hence the CODEC required for the transmission of video information from terminal 123 to terminal 121.

Figure 4:
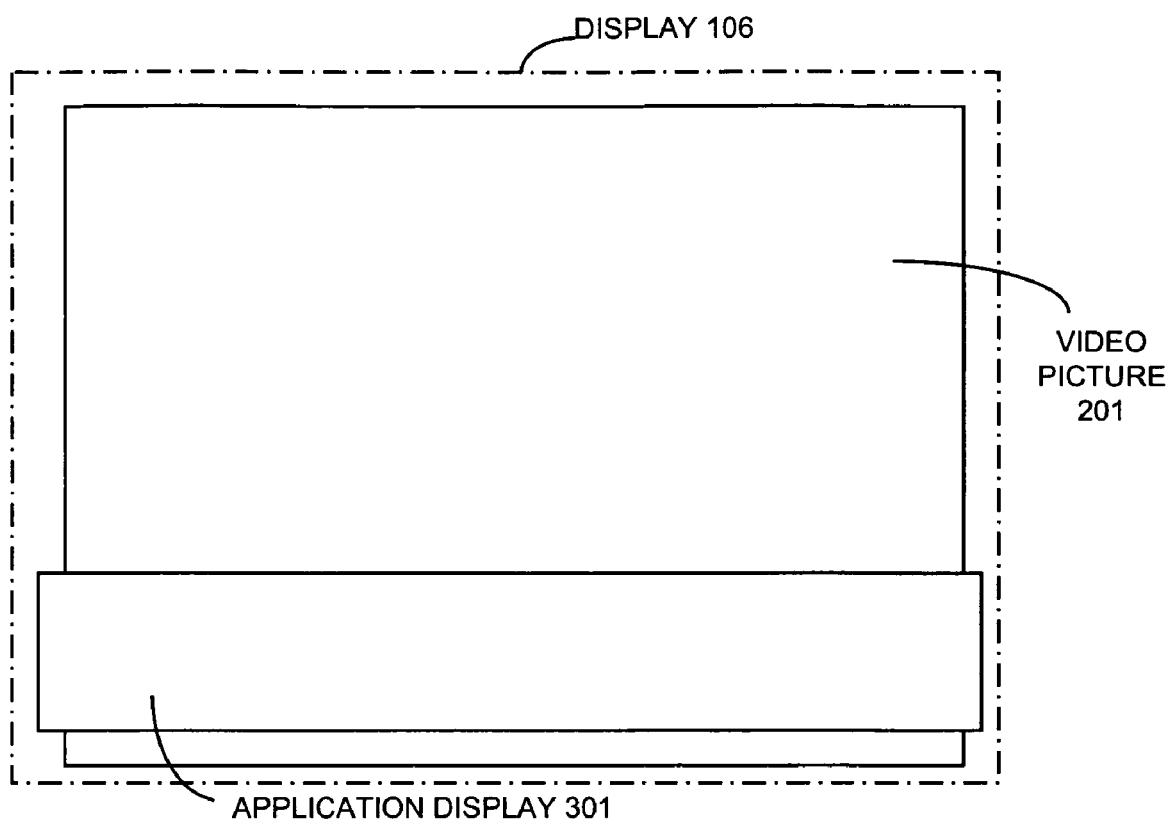

To understand the operations of the second embodiment, consider the following example. Initially, during the video call between terminal 121 and terminal 123, video picture 201 is as illustrated in FIG. 2 where video picture 201 occupies the entire screen of display 106 and is the only imaging object being displayed on display 106. Then the user actuates an application that brings up application display 301 as illustrated in FIG. 4. Application display 301 overlays a portion of video picture 201. Terminal 121 then transmits information to terminal 123 specifying the portion of video picture 201 that is overlaid by application display 301. Terminal 123 then ceases to transmit the video information of the portion of video picture 201 that is overlaid by application display 301.

Although the examples have explained the two embodiments as functioning separately, the two embodiments can also compliment each other and be in operation at the same time. Terminal 121 is illustrated in greater detail in FIG. 1.

Terminals 122 and 123 are similar in design. Processor 102 provides control of terminal 121 by executing programs and retrieving and storing data out of memory 101. Operating system 112 supplies the overall control. Interface 117 interacts with interfaces 103-109. Data is stored in data 113. Call processing is controlled by call processing routine 116. The selection and actuation of CODEC is controlled by CODEC routine 114. Display control routine 111 controls the manipulation of images on display 106. Video call control routine 108 controls the video aspects of a call. Audio generator routine 118 generates the necessary tones required for the operation of terminal 121. Units 105, 106, and 119 are interconnected to processor 102 via interfaces 107, 104, and 109, respectively.

Interface 103 contains the necessary hardware and software to interface and to communicate video calls via WAN 124.

Figure 5:
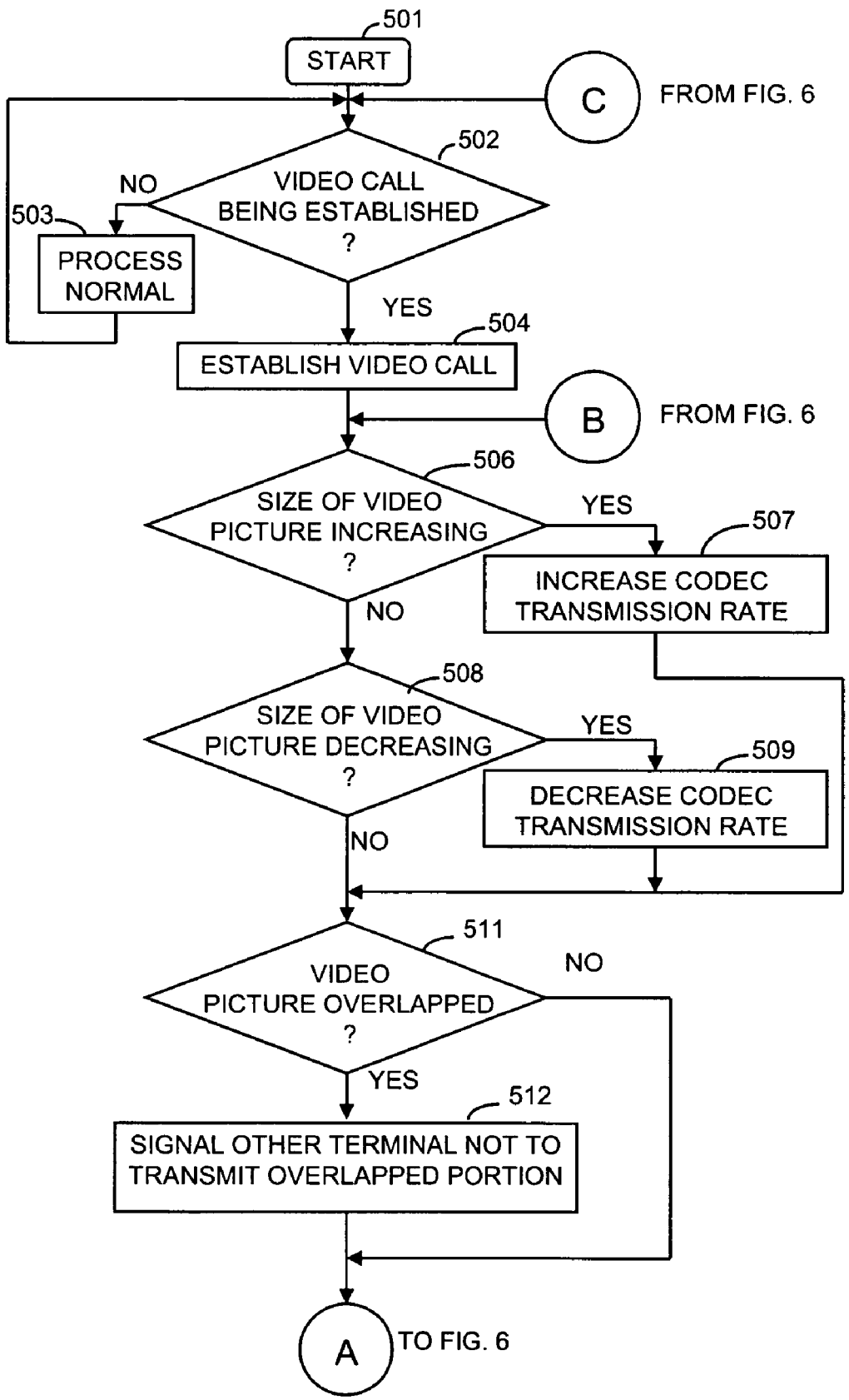
FIGS. 5 and 6 illustrate, in flowchart form, operations performed by an embodiment.
Figure 6:
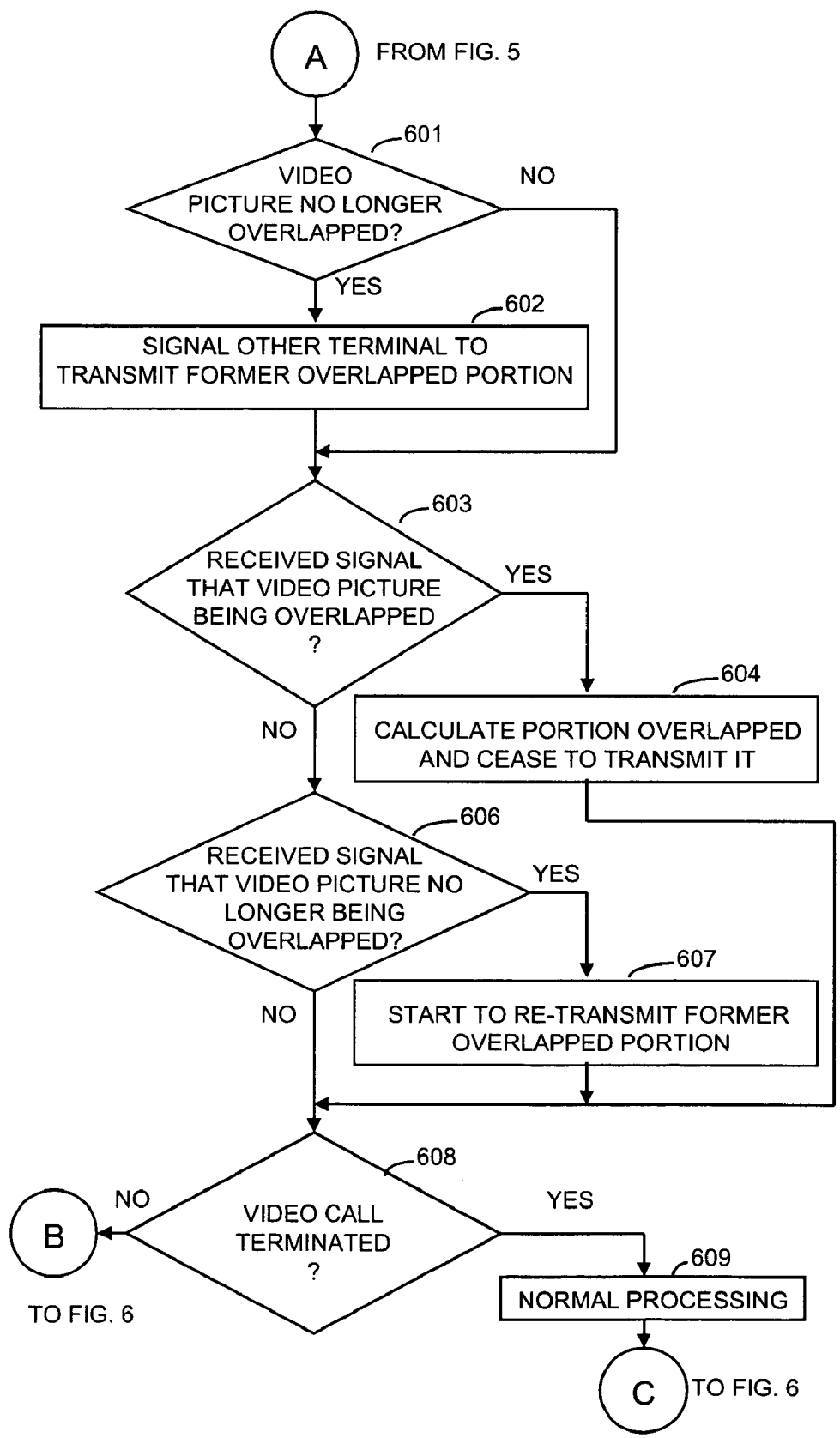

FIGS. 5 and 6 illustrate, in flowchart form, operations performed by an embodiment of a terminal. After being started in block 501, decision block 502 determines if a video call is being established. If the answer is no, block 503 performs normal processing before transferring control back to decision block 502. If the answer is yes in decision block 502, block 504 establishes the visual call.

After execution of block 504, decision block 506 determines if the size of the video picture has increased. If the answer is yes, block 507 increases the CODEC transmission rate either by choosing a new CODEC or increasing the transfer rate of the existing CODEC before transferring control to decision block 511.

If the answer is no in decision block 506, decision block 508 determines if the size of the video picture is decreasing. If the answer is yes, block 509 decreases the CODEC transmission rate by choosing a new CODEC or using an existing CODEC but lowering the transmission rate before transferring control to decision block 511.

If the answer in decision block 508 is no, decision block 511 determines if the video picture is being overlapped. If the answer is yes, control is transferred to block 512 which signals the other terminal not to transmit the overlap portion before transferring control to decision block 601 of FIG. 6.

If the answer in decision block 511 is no, decision block 601 determines if the video picture is no longer being overlapped. If the answer is yes, block 602 signals the other terminal to transmit the formerly overlapped portion before transferring control to decision block 603.

If the answer in decision block 601 is no, decision block 603 determines if a signal is being received from the endpoint of the call indicating that the video picture is being overlapped. This is the video picture that is being transmitted from the terminal executing the steps illustrated in FIG. 6. If the answer is yes, block 604 calculates the portion that is being overlapped and ceases to transmit that portion before transferring control to decision block 608.

If the answer in decision block 603 is no, decision block 606 determines if a signal has been received from the endpoint indicating that the video picture is no longer being overlapped on the endpoint. This signal would be received from the terminal that is the endpoint of the video call. If the answer is yes in decision block 606, block 607 starts to retransmit the formerly overlapped portion before transferring control to decision block 608.

Decision block 608 determines if the video call has been terminated. If the answer is no, control is transferred back to decision block 506 of FIG. 5. If the answer is yes, block 609 performs normal processing before returning control back to decision block 502 of FIG. 5.

When the operations of the terminals, servers, or systems are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The software can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, or transport the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where the terminals, servers, or systems is implemented in hardware, the stations, servers, or systems can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above would be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed:

1. A method for controlling use of transmission bandwidth, comprising:
   detecting a change in an amount of a video picture that is visible on a receiving telecommunication terminal;
   transmitting the detected change to a transmitting telecommunication terminal; and
   adjusting the transmission rate of the video picture in response to the detected change by the transmitting telecommunication terminal.

2. The method of claim 1 wherein the amount of video picture that is visible increases and the adjusting comprises increasing the transmission rate.

3. The method of claim 1 wherein the amount of video picture that is visible decreases and the adjusting comprises decreasing the transmission rate.

4. The method of claim 1 wherein the adjusting comprises changing the type of CODEC used for the video transmission.

5. A computer-readable medium for controlling use of transmission bandwidth, comprising computer-executable instructions configured for:
   detecting a change in an amount of a video picture that is visible on a receiving telecommunication terminal;
   transmitting the detected change to a transmitting telecommunication terminal; and
   adjusting the transmission rate of the video picture in response to the detected change by the transmitting telecommunication terminal.

6. The computer-readable medium of claim 5 wherein the amount of video picture that is visible increases and the adjusting comprises increasing the transmission rate.

7. The computer-readable medium of claim 5 wherein the amount of video picture that is visible decreases and the adjusting comprises decreasing the transmission rate.

8. The computer-readable medium of claim 5 wherein the adjusting comprises changing the type of CODEC used for the video transmission.

9. An apparatus for implementing the method of claim 1.

10. An apparatus for implementing the method of claim 4.

* * * * *